United States Patent [19]

Ringer

[11] Patent Number: 4,462,853

[45] Date of Patent: Jul. 31, 1984

[54] TRANSFER PRINTING FLOOR TILE

[75] Inventor: Richard M. Ringer, Lancaster, Pa.

[73] Assignee: Armstrong World Industries, Inc., Lancaster, Pa.

[21] Appl. No.: 424,757

[22] Filed: Sep. 27, 1982

[51] Int. Cl.³ .......................... B44C 1/16; B32C 31/00; B29C 19/00; B65H 29/24

[52] U.S. Cl. .................................... 156/238; 156/241; 156/274.6; 156/300; 271/193

[58] Field of Search ............... 156/234, 238, 230, 235, 156/239, 240, 241, 249, 272.6, 273.1, 274.4, 274.6, 285, 562, 300, 344; 198/691; 430/126, 902; 271/193

[56] References Cited

U.S. PATENT DOCUMENTS

| | | | |
|---|---|---|---|
| 3,071,179 | 1/1963 | Tourtellotte et al. | 198/691 |
| 3,463,695 | 8/1969 | Schweiker et al. | 156/562 |
| 3,508,993 | 4/1970 | Belcher et al. | 156/285 |
| 4,060,441 | 11/1977 | Ohta et al. | 156/234 |
| 4,231,828 | 11/1980 | Mintz | 156/238 |
| 4,239,569 | 12/1980 | Harvey | 156/235 |
| 4,239,570 | 12/1980 | Kerwin | 156/238 |
| 4,244,465 | 1/1981 | Hishikawa et al. | 271/193 |
| 4,245,555 | 1/1981 | Alston | 156/240 |
| 4,253,896 | 3/1981 | Appleyard et al. | 156/234 |

*Primary Examiner*—Edward C. Kimlin
*Assistant Examiner*—Louis Falasco

[57] ABSTRACT

The invention is directed to a process for printing floor tile. The transfer sheet containing the design to be placed upon the floor tile is utilized as the carrier for the floor tile as it passes through the processing operation. The floor tile is positioned upon the transfer sheet in register with the design on the transfer sheet. The tile is held in position on the transfer sheet by static electricity and is fed between laminated rolls which laminate the transfer sheet to the floor tile. Subsequent removal of the transfer sheet from the floor tile leaves the design of the transfer sheet on the surface of the floor tile.

2 Claims, 2 Drawing Figures

TRANSFER PRINTING FLOOR TILE

BACKGROUND OF THE INVENTION

1. Field of the Invention

The invention is directed to a process for transfer printing floor tile and, more particularly, to a process wherein the transfer sheet functions as the conveyor for the item to receive the transferred print.

2. Description of the Prior Art

U.S. Pat. No. 4,239,569 discloses a method for transferring a heat transferable design from a web-like carrier onto inflated articles carried by conveying means to a station at which the transfer occurs.

U.S. Pat. No. 3,952,131 teaches that printing is transferable from a strippable print sheet to a substrate by lamination between heated platents.

U.S. Pat. No. 3,583,889 shows the application of an adhesive web onto the top of tile products spaced along a conveyor and subsequent severing of the web between adjacent products.

U.S. Pat. Nos. 2,576,882; 3,508,993; 3,690,646; and 3,892,614 are of interest for the disclosure of the use of electrostatic fields in conveying and laminating arts.

Finally, U.S. Pat. No. 3,231,448 is directed to a device for the heat transfer of labels.

The state of the art would appear to indicate that the combination of the transfer sheet and conveyor structure as a single structure is not shown in the art. By making the transfer sheet the conveyor structure and placing the pattern to be transferred on the upper surface of the transfer sheet, the article to receive the transfer print can now be placed upon the top of the transfer sheet. It is now possible to visibly check the register of the article to be printed with the print to be applied.

SUMMARY OF THE INVENTION

A transfer paper is placed on storage rolls. By a low, constant tension, using a driven pull roll, the paper is advanced from the storage roll through an appropriate across machine direction guider. The transfer paper is then moved out onto a horizontal plane with the transfer design printed on the upper surface thereof. Tile is fed to the horizontal plane of the transfer sheet and through appropriate controls is deposited in register on the top of the transfer sheet so that the outline of the tile is in register with the outline of the design to be transferred. The transfer sheet and tile are held together by static electricity. The transfer sheet and tile passed above a heater structure which provides heat to the interface between the transfer sheet and tile. The transfer sheet and tile pass through a laminator structure which consolidates the two structures. The transfer sheet is then stripped from the tile and the design printed on the transfer sheet is left on the surface of the tile. The transfer sheet then passes around a downstream pull roll which has maintained tension on the transfer sheet during its conveying function and the transfer sheet then passes to an appropriate storage roll.

DESCRIPTION OF THE PREFERRED EMBODIMENT

Figure 1:
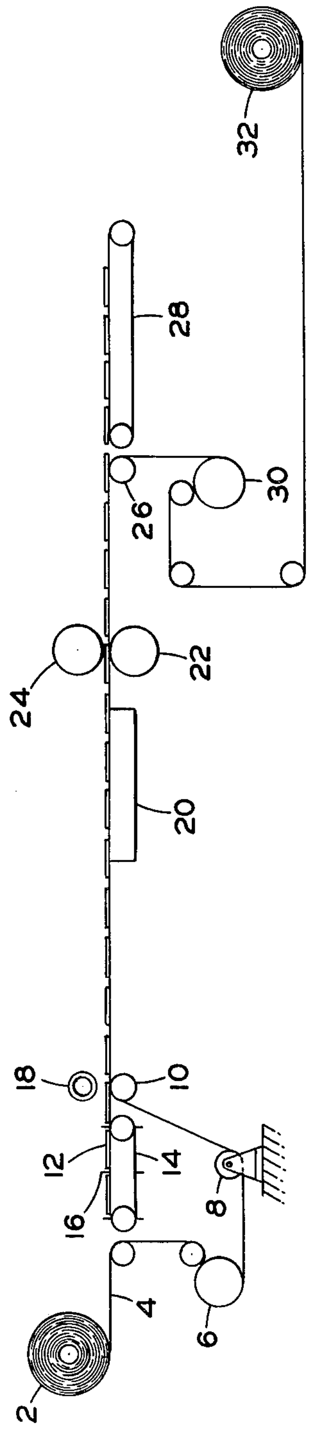
FIG. 1 of the drawing is a schematic view showing the process and apparatus herein for carrying out the inventive process for transfer printing floor tile.

The invention herein involves the transfer printing of tile blanks wherein the transfer sheet functions as the conveyor for transporting the tile blanks through the manufacturing operation. By utilizing the method to be described below, it is now possible to feed the tile blanks on top of the transfer paper and allow the manufacturing operation to move at a continuous speed with no stop or start motion.

Another advantage exists in that, at the registration point, the transfer sheet and the tile blanks are at ambient temperature and that the printed side of the transfer paper is facing up, allowing immediate visual verification of the registration accuracy of the printed design on the transfer paper and the tile blank.

Another advantage exists in that the transfer paper carries the tile in register with the printing through the total transfer printing process. Therefore, auxiliary conveyor parts are not required.

Another advantage of the process herein is that production speed are higher than normally experienced and that one can achieve a production speed of 80 lineal feet per minute while still holding accurate registration.

A final advantage exists in that the transfer paper, transfer ink, and tile interface can be heated to an optimum transfer temperature by means of heated platens under and supporting the transfer paper just before it and the tile reach the transfer nip. This can be done without overheating the parts because of the time versus temperature heat transfer characteristics and the thinness of the paper versus the tile.

The process begins with the transfer paper being positioned on the storage roll 2. The transfer paper 4 is removed from the storage roll by a pull roll and metering roll 6 which pulls the transfer paper off the storage roll and feeds or meters the transfer paper at a constant speed. The transfer paper moves from the roll 6 to a conventional Fife roll guider 8 which is used to control the across machine direction registration as the transfer paper moves over roll 10. The tile blank is to be placed upon the transfer paper in the vicinity of roll 10 and it is therefore necessary that the transfer sheet be in registration with the points at which the sides of the tile will be positioned so that there is side-by-side registration of the tile and the pattern printed on the transfer sheet. The pattern will exist on the transfer sheet on the side of the transfer sheet which is facing upward in the vicinity of roll 10.

The tile blanks 12 will be carried on a conveyor 14 and fed towards roll 10. Small lugs 16 on the conveyor 14 push the tile towards the roller 10. A conventional registration control system such as the Champaign Control System #425 and #500 will secure registration between the tile and the design printed on the transfer sheet. The registration control system will sense the position of lugs 16 on the conveyor 14 and also reference marks which are positioned between each repeat pattern on the transfer sheet. The marks will be kept in a relationship so that, when the transfer paper passes over roll 10, the tile will be pushed thereon with the center of the tile on the center of each design on the transfer paper. The tile is thus placed on the transfer paper in register along the machine direction of the transfer paper. At this point, we now have the tile product positioned in register with the printed pattern on the transfer sheet, in both the machine and across-machine direction.

A conventional static electricity charge unit 18 such as that sold by Simco Company and identified as their model N26C plus RC-4 electrostatic charger is used to provide an appropriate electrostatic charge between the transfer paper and the tile blank. Basically, the transfer paper is grounded through the roll 10 which is grounded. A static charge is then placed on the tile blank through tube 18 which is part of a conventional static charge apparatus. The transfer sheet now moves in a horizontal plane with the tile blank outside dimensions in register with the outside dimensions of the pattern to be printed and the two structures, the transfer paper and the tile, being held in registration by static electricity. The assemblage now passes over a heater 20 which will warm the interface of the transfer sheet, i.e., the upper surface of the transfer sheet, and the lower face of the tile blank to approximately 330° F. It is at this interface that there exists the ink which must be transferred from the transfer paper to the tile. The tile then passes between the two roll laminator structure 22 and 24 which then applies a pressure of approximately 100 pounds per square inch to the interface of the transfer paper and the tile blank. The transfer paper then passes around a roll 26 which strips the transfer paper from the tile blank and the tile blank continues moving in a horizontal plane onto conveyor 28. As is conventional in the transfer printing art, the ink which was on the transfer paper now adheres to the lower face of the tile blank and is stripped off the transfer paper. The transfer paper passes around the downstream pull roll 30 which has pulled the transfer paper through the above described process steps. The transfer paper then feeds to a storage roll 32. The pull roll and metering roll 6 is driven by the same drive that drives the downstream pull roll 30. However, a frictional clutch is positioned before roll 30. Roll 30 is designed to run at a slightly greater speed than roll 6 so as to maintain a tension on the transfer paper between the two rolls. The friction clutch slips if the tension of the sheet exceeds a certain desired level so that there will be no tearing of the sheet between the two rolls. This friction clutch arrangement is conventional in the art and the use of a single drive with a two roll conveyor structure is old in the art.

Figure 2:
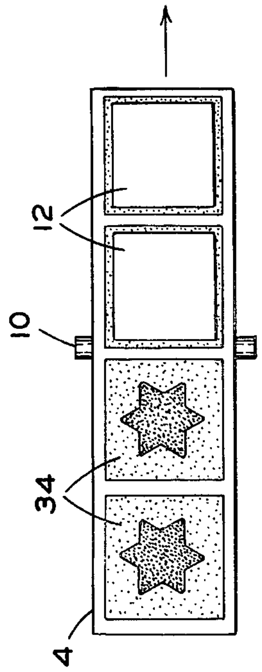
FIG. 2 is a top view of the transfer sheet prior to placement of the tile thereon and subsequent to the placement of tile thereon.

Referring now to FIG. 2 there is shown a view looking down upon the top of the transfer sheet 4 in the region of roll 10. The transfer sheet is provided with a series of repeat designs 34 on the surface thereof. A tile blank 12 is positioned on the top surface of the transfer sheet 4 and its peripheral edges are placed generally in registration with the peripheral edge of each repeat design on the transfer paper. It is rather clear that by simply looking at the tile sitting on the transfer paper one can readily determine whether or not there has been misregistration of the tile with the transfer print. It is much better to pick up an error in misregistration in the vicinity of roll 10 rather than in the vicinity of conveyor 28 which would be the situation in a normal processing operation wherein the tile blank would be carried on a conveyor and the transfer paper would come down on the top of the tile blank so that transfer would be carried out but without one being able to visually observe the registration between the transfer paper and the tile blank, thus delaying corrective action by an operator.

What is claimed is:

1. A process for transfer printing blanks of material having a periphery comprising the steps of:

(a) passing only a transfer sheet with designs thereon, an upper surface and a periphery down a process line in a horizontal plane with the transfer sheet being positioned so that a series of repeat pattern designs thereon are positioned on the upper surface of the transfer sheet as it moves in said aforementioned horizontal plane, (b) depositing on the upper surface of the transfer sheet the blank to be transfer printed with the periphery of the blank being placed in register with the periphery of one of the repeat pattern designs on the transfer sheet, (c) visually observing the registration of the blank to be printed with the repeat pattern of the transfer sheet, (d) holding said blank in register with the design on the transfer sheet by a static charge, (e) conveying only on the transfer sheet as the carrier for the blank thereon from the time where the transfer sheet receives the blank to the time where there will be lamination of the blank and transfer sheet, (f) passing the transfer sheet and the blank through a heating step and then a laminating step to laminate the transfer paper and the blank together, and (g) subsequently separating the transfer paper from the blank with the design of the transfer paper now transferred in register to the blank which was to be printed.

2. The process of claim 1 wherein there is provided the additional step of:

(a) providing the transfer paper with a pull roll prior to the time that the blank to be printed is deposited on the transfer sheet and a pull roll after the transfer paper is stripped from the blank so that the transfer paper is maintained under tension and moved through the process.

* * * * *